US006978004B1

(12) United States Patent
Levine

(10) Patent No.: US 6,978,004 B1
(45) Date of Patent: *Dec. 20, 2005

(54) SYSTEM AND METHOD FOR PROVIDING A SIMULTANEOUS RING SERVICE FOR MULTIPLE LANDLINE OR WIRELESS TELECOMMUNICATIONS UNITS

(75) Inventor: David A. Levine, Smyrna, GA (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 420 days.

This patent is subject to a terminal disclaimer.

(21) Appl. No.: 10/113,399

(22) Filed: Apr. 1, 2002

Related U.S. Application Data

(63) Continuation-in-part of application No. 09/877,967, filed on Jun. 8, 2001.

(51) Int. Cl.[7] ............. H04M 3/42; H04M 7/00; H04Q 7/20
(52) U.S. Cl. ............. 379/211.04; 379/221.08; 455/461
(58) Field of Search ............. 379/211.01–211.04, 379/207.02, 207.16, 221.08–221.12, 229, 379/230; 455/461

(56) References Cited

U.S. PATENT DOCUMENTS

| 5,163,156 A | 11/1992 | Leung et al. ............. 395/800 |
| 5,206,901 A * | 4/1993 | Harlow et al. ............. 379/211.04 |
| 5,438,568 A | 8/1995 | Weisser, Jr. ............. 370/60 |
| 5,487,111 A | 1/1996 | Slusky ............. 379/211 |
| 5,502,762 A | 3/1996 | Andrew et al. ............. 379/202 |
| 5,664,005 A | 9/1997 | Emery et al. ............. 455/422 |
| 5,890,064 A | 3/1999 | Widergen et al. ............. 455/445 |
| 5,956,631 A | 9/1999 | Gerszberg et al. ............. 455/403 |
| 5,963,864 A | 10/1999 | O'Neil et al. ............. 455/445 |
| 6,337,857 B1 | 1/2002 | Booton ............. 370/352 |
| 6,381,323 B1 | 4/2002 | Schwab ............. 379/211.02 |
| 6,694,004 B1 * | 2/2004 | Knoerle et al. ............. 379/211.04 |

OTHER PUBLICATIONS

"Home of Simultaneous Ring™", 2002 SimulRing, Inc., "www.simulring.com."
U.S. Appl. No. 09/966,338, filed Sep. 28, 2001, entitled "Automatically Simultaneously Ringing Alternative Telephone Numbers", Inventors: Levine et al.
U.S. Appl. No. 09/896,922, filed Jun. 29, 2001, entitled "Automatically Sequentially Ringing Alternative Telephone Numbers", Inventors: Worsham, et al.
U.S. Official Action dated Jan. 30, 2003 in U.S. Appl. No. 09/966,338.
U.S. Official Action dated Jul. 17, 2003 in U.S. Appl. No. 09/966,338.
U.S. Official Action dated Feb. 12, 2004 in U.S. Appl. No. 09/966,338.
U.S. Official Action dated Jan. 14, 2004 in U.S. Appl. No. 09/877,967.
U.S. Official Action dated Jan. 26, 2005 in U.S. Appl. No. 09/877,967.

* cited by examiner

*Primary Examiner*—Benny Q. Tieu
(74) *Attorney, Agent, or Firm*—Merchant & Gould

(57) ABSTRACT

A system for providing a simultaneous ring service for a subscriber. The system allows a subscriber to identify one or more telecommunication units that should be rung simultaneously with the subscriber's landline telecommunications unit when a call is directed to the landline unit. A list of numbers to be simultaneously rung is maintained by the subscriber and may be stored at a service control point. Ringing wireless numbers is initiated prior to ringing wireline numbers to account for timing delays inherent in wireless communications systems.

22 Claims, 8 Drawing Sheets

SYSTEM AND METHOD FOR PROVIDING A SIMULTANEOUS RING SERVICE FOR MULTIPLE LANDLINE OR WIRELESS TELECOMMUNICATIONS UNITS

CROSS-REFERENCE TO RELATED APPLICATIONS

This patent application is a continuation-in-part of U.S. patent application Ser. No. 09/877,967 filed on Jun. 8, 2001, entitled "System and Method for Providing a Simultaneous Ring Service for a Landline Telecommunications Unit and An Associated Wireless Telecommunications Unit," which is expressly incorporated herein by reference.

FIELD OF THE INVENTION

The present invention relates generally to telecommunications services and, more particularly, to systems and methods for providing a simultaneous ring service for multiple landline or wireless telecommunications units.

BACKGROUND OF THE INVENTION

Increasingly in today's society there is a need for individuals to "stay in touch," whether it be with business contacts, co-workers, friends or family. A primary avenue for allowing individuals to stay in touch are the telephone networks, both landline or wireless. These telecommunication methods have their drawbacks, however. Significantly, if an individual is not sufficiently proximate to their telephone, the individual cannot answer an incoming call before it stops ringing, in which case the call often goes unanswered. The advent of answering machines and voice messaging systems have ameliorated this problem, but even these technological advancements are not acceptable for all situations. Some circumstances simply require more personal communication capabilities.

One known solution to this problem is the so-called "simultaneous ring" telephone service. According to the typical simultaneous ring service, when a called party receives an incoming call on their landline telephone, a wireless telephone associated with the called party would ring relatively simultaneously, allowing the called party to answer the most accessible phone. For example, a person may have the simultaneous ring service established for his work phone, such that whenever a calling party calls him at work, not only does his work phone ring, but also his wireless telephone may ring. As a result, the businessman need not miss any important work-related calls when he is out of the office.

There are a number of known mechanisms for implementing the simultaneous ring service. One is a switch-based system. In a switch-based system, an incoming call to a pre-designated directory number is additionally routed to a number of other pre-designated directory numbers. For example, an incoming call to the businessman's work phone may also be additionally routed to the businessman's home and/or mobile phones. The switch-based systems, however, treat each call the same. Accordingly, when one of the other pre-designated directory numbers is for a mobile phone, the system cannot account for inherent delays in wireless networks when connecting calls to mobile end users. As a result, a disgruntled calling party is likely to hear an unacceptable number of rings from a landline telephone before the mobile end user is able to answer. Alternatively, an answering system for the landline phone may answer before the mobile end-user can answer, thus precluding realization of the very benefits that the simultaneous ring service was intended to provide. A switch supporting such a service is available from NORTEL NETWORKS of Research Triangle Park, N.C.

These switch-based systems also suffer from a number of other serious problems. First, a subscriber is only able to activate or deactivate the simultaneous ring service from their landline telecommunications unit. The subscriber cannot activate or deactivate the service from a wireless telephone. Moreover, because the service is switch-based, the service cannot take into account the timing delays associated with wireless networks and cannot start a call to a wireless network prior to starting a call to a telephone number on a wired network. Accordingly, these systems cause outgoing telephone calls to landline telecommunications units to be placed prior to the calls to wireless telecommunications units. Therefore, the telephones are not simultaneously rung. Moreover, because these prior systems are switch-based, they cannot check the status of wireless telephones to be simultaneously rung prior to entering call setup. This may result in the unnecessary use of network resources. Additionally, prior art switch-based systems are limited to ringing a maximum of five wireline or wireless telephones. It is often desirable to have more than five phones simultaneously rung.

Accordingly, there exists a need for a simultaneous ring service that can simultaneously ring any number of wireline or wireless telephone lines. There also exists a need for such a service that effectively interfaces with wireless networks and accounts for delays in these networks. There further exists a need for such a service that may be administered by the subscriber from any wired or wireless telephone unit.

SUMMARY OF THE INVENTION

The present invention is directed to a system and method for providing a simultaneous ring service for a service subscriber. The system utilizes the functionality of the Advanced Intelligent Network ("AIN"), and allows the subscriber's designated landline and wireless telecommunications units to ring relatively simultaneously in response to incoming communications to the subscriber's landline unit.

According to one embodiment of the present invention in which two telephone lines are simultaneously rung, the system includes a switch in communication with a landline telecommunications unit associated with the subscriber, a service control point in communication with the switch, and a services nodes in communication with the switch. The switch is for detecting a first terminating trigger specific to the service in response to an incoming communication to the landline telecommunications unit from a calling party. Once the switch detects the incoming call, the service control point may execute a series of verifications, including whether the subscriber's landline telecommunications unit and the subscriber's wireless telecommunications unit are available, i.e., not busy or otherwise inactive.

If neither telecommunications unit is unavailable, the service control point may then instruct the switch to route the incoming call to the services node. In response thereto, the services node may launch two outgoing communications. The intended destination of the first is the subscriber's wireless telecommunications unit and the intended destination of the second is the subscriber's landline telecommunication unit. However, because the services node is not provisioned with the directory number for the subscriber's wireless unit, both calls are routed to the switch. The switch may then detect a wireless indicator in the first outgoing communication from the services node and, in response thereto, query the service control point for the directory number of the subscriber's wireless unit. The service control point may then interrogate its associated database for the number, and then instruct the switch to route the first call to the subscriber's wireless unit. The second outgoing call from the services node may be routed by the switch to the subscriber's landline telecommunications unit. The services node may then connect whichever telecommunications unit answers first to the calling party. The other call may be dropped by the services node, and the completed call may be forwarded to the switch in order that the resources of the services node are no longer required for processing the completed communication.

According to another embodiment, due to inherent delays in existing wireless networks, the services node may place the outgoing communication intended for the subscriber's landline telecommunications unit a predetermined time period after placing the outgoing communication intended for the subscriber's wireless telecommunications unit. If either the subscriber's landline telecommunications unit or the wireless telecommunications unit is unavailable, the service control point may instruct the switch to route the incoming communication to the subscriber's landline telecommunications unit. Accordingly, use of the resources of the services node is avoided under such circumstances.

Embodiments of the present invention solve the problems experienced in the prior art by only attempting to reach the subscriber's wireless unit if it is available. As a result, in situations where the subscriber's wireless unit has a voice messaging system, the voice messaging system will not answer before the landline unit rings. In addition, embodiments of the present invention may accommodate inherent delays in wireless networks by, in situations where the wireless unit is available, routing the incoming call to the wireless unit a predetermined time period before routing it to the landline unit. In addition, because the network may maintain the directory number for the subscriber's wireless unit exclusively with the service control point, the present invention obviates the expense and time of provisioning the services node with the same data. Moreover, because completed calls are transferred from the services node to the switch that serves the services node, the present invention does not unnecessarily require the services of the services node for extended call processing purposes. Furthermore, embodiments of the present invention provide the ability to simultaneously ring any number of wired or wireless telephones.

According to yet another embodiment of the present invention, a system, method, and apparatus are provided in which a subscriber may identify any number of telecommunications units that should be rung simultaneously with the subscriber's landline telecommunications unit. The subscriber may administer the list of numbers to be simultaneously rung through a voice-driven administration system or through the use of a world wide web ("WWW") site. Once the subscriber has identified the list of numbers to be simultaneously rung, any communications directed toward the subscriber's landline telecommunications unit will cause each of the telecommunications units connected to the identified numbers to be rung simultaneously if the units are available.

In particular, according to this embodiment of the present invention, when a communication is directed toward the subscriber's landline telecommunications unit, the list of numbers to be simultaneously rung is retrieved. If any of the numbers are associated with wireless telecommunications units, a determination is made as to whether each of the wireless units is available. A status of the subscriber's landline is also determined. For each of the telecommunications units that are available, an outgoing communication is placed to simultaneously ring these units. The subscriber's landline telecommunications unit is also rung simultaneously. The first telephone number to be answered is connected to the incoming communication and each of the outgoing communications other than the first answered telephone number is then dropped. In this manner, any number of telephone lines may be simultaneously rung when an incoming communication is received that is directed toward the subscriber's landline telecommunications unit.

These and other benefits of the present invention will be apparent from the following Detailed Description.

BRIEF DESCRIPTION OF THE DRAWINGS

In the drawings, which are not necessarily drawn to scale, like numerals describe substantially similar components throughout the several views. Like numerals having different letter suffixes represent different instances of substantially similar components. The drawings illustrate generally, by way of example, but not by way of limitation, various embodiments discussed in the present document.

Figure 1:
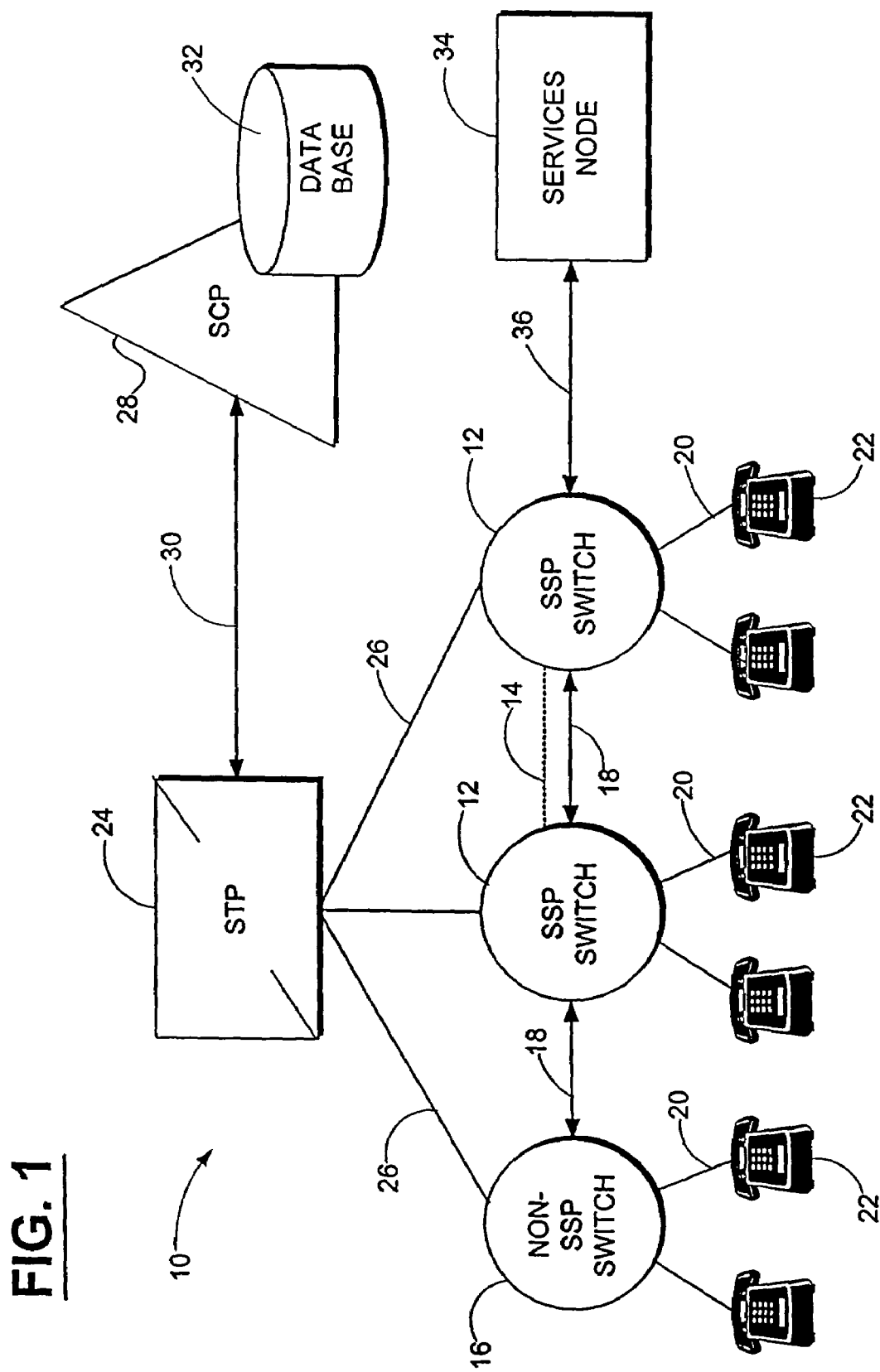
FIG. 1 is a block diagram showing an AIN for integration with a public switched telephone network utilized as an operating environment in one embodiment of the present invention.

DETAILED DESCRIPTION OF AN
ILLUSTRATIVE EMBODIMENT

It is to be understood that the figures and descriptions of the present invention have been simplified to illustrate elements that are relevant for a clear understanding of the present invention, while eliminating, for purposes of clarity, other elements of a conventional telecommunications network. For example, certain operating system details and modules of certain of the intelligent platforms of the network are not described herein. Those of ordinary skill in the art will recognize, however, that these and other elements may be desirable in a typical telecommunications network. However, because such elements are well known in the art, and because they do not facilitate a better understanding of the present invention, a discussion of such elements is not provided herein.

The term "calling party" is used herein generally to refer to the person or unit that initiates a telecommunication. The calling party may also be referred to herein as "caller." In some cases, the calling party may not be a person, but may be a device such as a facsimile machine, an answering service, a modem, etc. The term "called party" is used herein generally to refer to the person or unit that answers or responds to the call or communication. The term "communication" is used herein to include all messages or calls that may be exchanged between a calling party and a called party, including voice, data and video messages. The term "communication" is used synonymously herein with the term "call" unless a distinction is noted. The term "subscriber" is used herein to generally refer to a subscriber of the described telecommunications service.

The present invention is directed, according to one embodiment, to a system and method for providing a simultaneous ring service for a service subscriber. According to one embodiment of the service, when a calling party places an incoming call to, for example, a residential telephone or some other landline telecommunications unit associated with the subscriber, not only does the subscriber's landline unit ring, but also a wireless telecommunications unit associated with the subscriber rings. Accordingly, if the subscriber is away from their landline unit, the subscriber does not have to miss the call. According to other embodiments of the present invention, the subscriber may specify any number of landline or wireless numbers to be rung when a call is directed to the subscriber's landline telecommunications unit. As described further herein, according to certain embodiments the subscriber's landline and wireless units do not ring at precisely the same time. It should be noted that the units may not ring exactly simultaneously, but rather within a relatively brief time period. However, because this time period may be relatively brief, such as on the order of 0–3 seconds, the service is referred to herein as a "simultaneous ring" service.

According to one embodiment, the system utilizes the intelligent functionality of an AIN. The AIN is a network used in conjunction with a conventional telephone network, such as the Public Switched Telephone Network ("PSTN"), to provide enhanced voice and data services and dynamic routing capabilities using two different networks. The actual voice call is transmitted over a circuit-switched network, but the signaling is done on a separate packet-switched network. Before describing details of the system of the present invention, a description of the AIN is provided.

FIG. 1 is a block diagram showing an illustrative AIN 10 for integration with the PSTN. The AIN 10 may be employed by a Local Exchange Carrier ("LEC"), and may be utilized by the LEC to allow the LEC to provide call processing features and services that are not embedded within conventional switching circuits of the PSTN.

A typical LEC includes a number of central offices for interconnecting customer premises terminating equipment with the PSTN. For a LEC including the AIN 10 as illustrated in FIG. 1, the central offices may include one or more Service Switching Point ("SSP") switches 12. The dashed line 14 between the SSP switches 12 indicates that the number of SSP switches 12 in the AIN 10 may vary depending on the particular requirements of the AIN 10. The AIN 10 may also include a non-SSP switch 16. The difference between the SSP switches 12 and the non-SSP switch 16 is that the SSP switches 12 provide intelligent network functionality. Interconnecting the SSP switches 12 and the non-SSP switch 16 are communication links 18 which may be, for example, trunk circuits.

Each SSP switch 12 and non-SSP switch 16 has a number of subscriber lines 20 connected thereto. The subscriber lines 20 may be, for example, conventional twisted pair loop circuits connected between the switches 12, 16 and the telephone drops for the customer premises. The subscriber lines 20 may also comprise trunk circuits, such as T-1 trunk circuits. Typically, the number of subscriber lines 20 connected to each switch 12, 16 is on the order of ten thousand to one hundred thousand lines. Each of the subscriber lines 20 is connected to a terminating piece of customer premises equipment, represented in FIG. 1 by the landline telephones 22. Alternatively, the terminating equipment may be other types of telecommunications units such as, for example, a telecopier, a personal computer, a modem, or a private branch exchange ("PBX") switching system.

For the AIN 10 illustrated in FIG. 1, each SSP switch 12 and the non-SSP switch 16 are connected to a signal transfer point ("STP") 24 via a communication link 26. The communication link 26 may employ, for example, the SS7 switching protocol. The STP 24 may be a multi-port high speed packet switch that is programmed to respond to the routing information in the appropriate layer of the switching protocol, and route the data packets to their intended destination.

One of the intended destinations of the data packets from the STP 24 is a service control point ("SCP") 28. The STP 24 is in communication with the SCP 28 via a communication link 30, which may also employ the SS7 switching protocol. The SCP 28 may be an intelligent database server such as, for example, an Intelligent Network Service Control Point available from LUCENT TECHNOLOGIES INC., Murray Hill, N.J., and may have associated with it a network database 32 for storing network data. The intelligent functionality of the SCP 28 may be realized by application programs, such as programmable Service Program Applications ("SPA"), which are run by the SCP 28. The SCP 28 is normally employed to implement high volume routing services, such as call forwarding and number portability translation and routing. In addition, another of the functions of the SCP 28 is hosting of the network database 32, which may store subscriber information, such as subscriber call management profiles, used in providing enhanced calling services, such as the simultaneous ring service of the present invention.

According to one embodiment of the present invention, the network database 32 is operative to store a list of telephone numbers that should be simultaneously rung when a telephone call is placed through the subscriber's landline telecommunications unit. According to this embodiment of the present invention, multiple landline and wireless telephone numbers may be specified by the subscriber. The subscriber may identify the numbers to simultaneously run through the use of a voice driven administration system. Access to the administration system may be provided through caller ID information received from the subscriber's wireless or landline telephone numbers. If no caller ID is received from the subscriber's telecommunications unit, the subscriber may be prompted to provide a telephone number and PIN to identify their account. Once the subscriber has gained access to the administration system, the subscriber may be permitted to add or remove numbers to be simultaneously rung. These numbers may be stored in the network database 32 and retrieved when a call is directed to the subscriber's landline telecommunications unit. According to alternative embodiments of the present invention, a www site may be provided at which the subscriber can administer the list of numbers to be rung simultaneously. Additional details regarding the embodiment of the present invention for ringing multiple subscriber telephone numbers will be described in greater detail below with reference to FIGS. 4A–4D.

The AIN 10 illustrated in FIG. 1 also includes a services node ("SN") 34. The SN 34 may be, for example, a Compact Services Node ("CSN") available from LUCENT TECHNOLOGIES INC., Murray Hill, N.J., although the SN 34 may be any other type of available AN-compliant SN. The SN 34 may be connected to one or more of the SSP switches 12 via a communications link 36 which may be, for example, an Integrated Service Digital Network ("ISDN") connection, including BRI ("Basic Rate Interface") or PRI ("Primary Rate Interface") lines. According to other embodiments, the communications link 36 may be, for example, a T-1 trunk circuit.

The SN 34 may be used primarily when some enhanced feature or service is needed that requires an audio connection to the call such as, for example, the call return and calling name services. Similar to the SCP 28, the intelligent functionality of the SN 34 may be realized by programmable applications executable by the SN 34. In addition, according to one embodiment, the SN 34 does not store any subscriber data necessary for implementing the simultaneous ring service of the present invention such as, for example, the directory number of the subscriber's wireless telephone unit.

In order to keep the processing of data and calls as simple as possible at the switches, such as at the SSP switches 12, a set of triggers may be defined at the SSP switches 12 for each call. A trigger in an AIN is an event associated with a particular subscriber line 20 that generates a query that is sent from the SSP switch 12 servicing the particular subscriber line 20 to the SCP 28 via the STP 24. The triggers may be originating triggers for calls originating from the subscriber premises or terminating triggers for calls terminating at the subscriber premises. A trigger causes a message in the form of a query to be sent from the SSP switch 12 to the SCP 28.

The SCP 28 in turn interrogates the database 32 to determine whether some customized call feature or enhanced service should be implemented for the particular call, or whether conventional dial-up telephone service should be provided. The results of the database inquiry are sent back from the SCP 28 to the SSP switch 12 via the STP 24. The return packet includes instructions to the SSP switch 12 as to how to process the call. The instructions may be to take some special action as a result of a customized calling service or enhanced feature. For example, for an enhanced calling feature requiring the capabilities of the SN 34, the return message from the SCP 28 may include instructions for the SSP switch 12 to route the call to the SN 34. In addition, the return message from the SCP 28 may simply be an indication that there is no entry in the database 32 that indicates anything other than conventional telephone service should be provided for the call. The query and return messages may be formatted, for example, according to conventional SS7 Transaction Capabilities Application Part ("TCAP") formats. U.S. Pat. No. 5,438,568, which is incorporated herein by reference, discloses additional details regarding the functioning of an AIN.

The AIN 10 illustrated in FIG. 1 includes only one STP 24, one SCP 28, one network database 32, and one SN 34, although the AIN 10 may further include an additional number of these components as well as other network components which not are included in FIG. 1 for purposes of clarity. For example, the AIN 10 may additionally include redundant SCPs and STPs to take over if the STP 24 or the SCP 28 should fail. In addition, the AIN 10 may include an Automatic Electronic Switching System ("AESS") Network Access Point ("NAP") in communication with the STP 24, which may be programmed to detect the trigger conditions. Further, the AIN 10 may include regional STPs and regional SCPs in communication with, for example, the local STP 24, for routing and servicing calls between different LECs.

Figure 2:
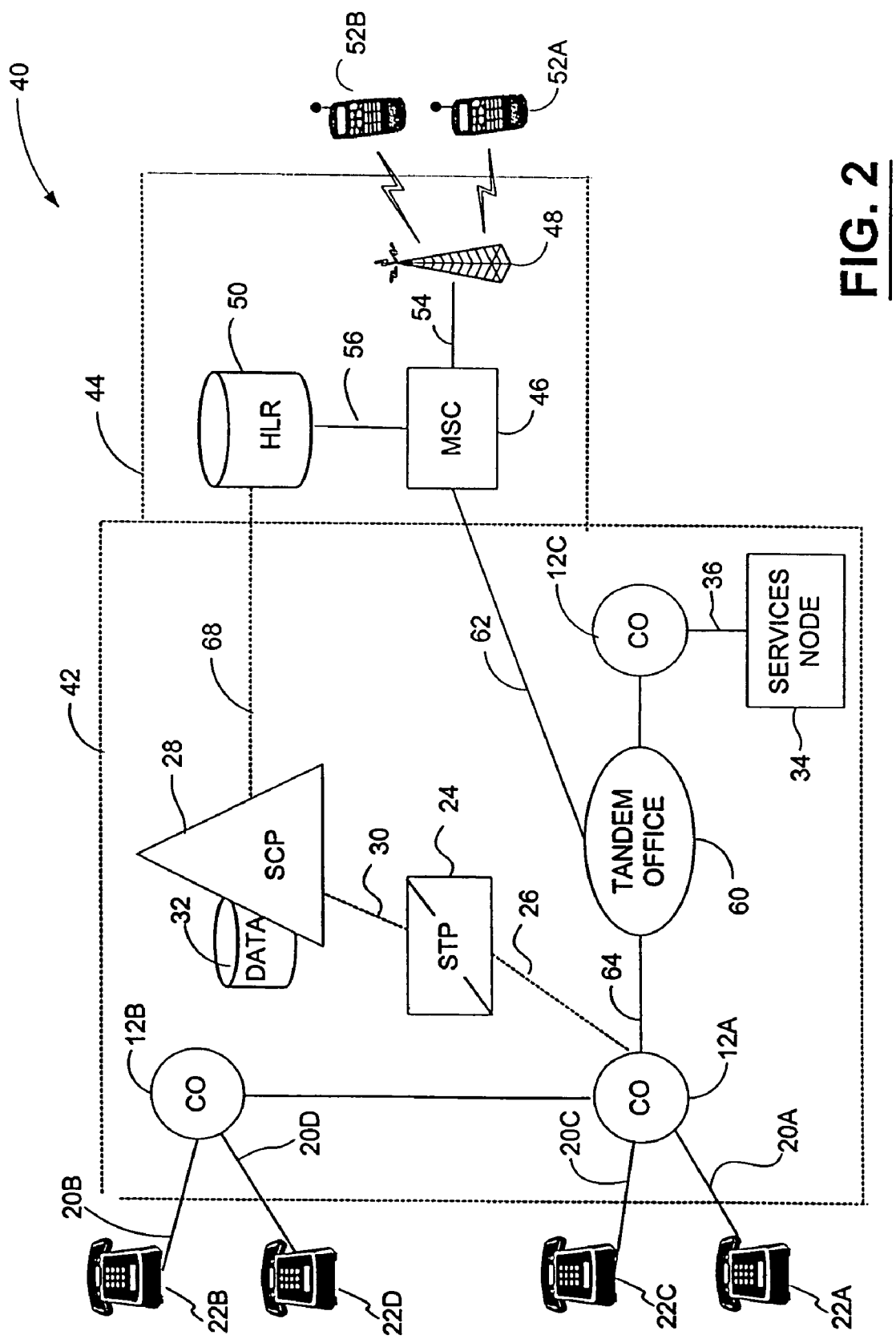
FIG. 2 is a block diagram showing a system provided according to one actual embodiment of the present invention.

As discussed briefly above, the present invention is directed, according to one embodiment, to a system for providing a simultaneous ring service for a service subscriber. FIG. 2 is a diagram of a system 40 according to one such embodiment. The system 40 includes a landline network 42 and a wireless network 44. The landline network 42 includes portions of an AIN as described in conjunction with FIG. 1, including the CO SSP switches 12A–12C (designated as "CO" in FIG. 2 and referred to as "CO switch(es)" hereinafter), the STP 24, the SCP 28, and the SN 34. For purposes of clarity, other elements of an AIN are not shown in FIG. 2.

The wireless network 44 includes a mobile switching center ("MSC") 46, a base transceiver station ("BTS") 48, and a home location register 50. The MSC 46 is in communication with one or more wireless telecommunications units 52A and 52B, such as a wireless telephone as illustrated in FIG. 2, via the BTS 48. The BTS 48 may communicate with wireless telecommunications units 52A and 52B according to an air-interface communication scheme such as, for example, AMPS (ANSI-553), TDMA (IS 136), CDMA (IS-95), or GSM. The BTS 48 may be in communication with the MSC 46 via the communications link 54. The MSC 46 is an automatic switching system in a wireless telecommunications network that acts as the interface for subscriber traffic between the wireless network 44 and the landline network 42 or other MSCs in the same or other wireless networks. The MSC 46 performs the same general function as a central office switch in a landline based system. In addition, the MSC 46 supports incoming calls through a radio telecommunications front-end, as well as handoff and roaming functions. Accordingly, the MSC 46 may include wireless IN functionality for detecting originating and terminating triggers.

The MSC 46 may be in communication with the HLR 50 via a communications link 56 which may, for example, be an SS7 signaling protocol link. The HLR 50 is a location register to which the user identity of a wireless telecommunications unit, such as the wireless telephone 52A, is assigned for record purposes. The HLR 50 may register subscriber information relating to the wireless telecommunications units such as, for example, profile information, current location, and authorization period. When the MSC 46 detects a wireless telecommunications unit entering the MSC's service area, the MSC 46 performs a registration process that includes requesting subscriber profile information from either the HLR 50 or a visitor location register ("VLR")(not shown), depending upon whether the wireless telephone 52A is within its home location or within a visitor location. Typically for integrated wireless networks, the VLR assigned to the service area of a visiting wireless subscriber is updated with information from the HLR associated with the wireless subscriber's wireless service provider ("WSP"). Accordingly, the MSC 46 servicing a particular area has access to information regarding each of the wireless users presently in its service area.

The landline network 42 additionally includes a tandem office 60, which provides a switching interface between the landline network 42 and the wireless network 44. The tandem office 60 may be in communication with the MSC 46 via a communications link 62, which may be, for example, a trunk circuit or an ISDN circuit. In addition, the tandem office 54 may be in communication with the CO switches (such as the CO switches 12A and 12C as illustrated in FIG. 2) via communications links 64 and 66 respectively, which may be, for example, trunk circuits. In addition, the SCP 28 may be in communication with the HLR 50 of the wireless network 44 via a communications link 68 employing, for example, the IS-41 signaling protocol. For clarity in FIG. 2, communications links that are used exclusively for signaling (e.g., no call data) are illustrated with dashed lines, and communications links that transfer signaling and/or call data are illustrated with solid lines.

Figure 3A:
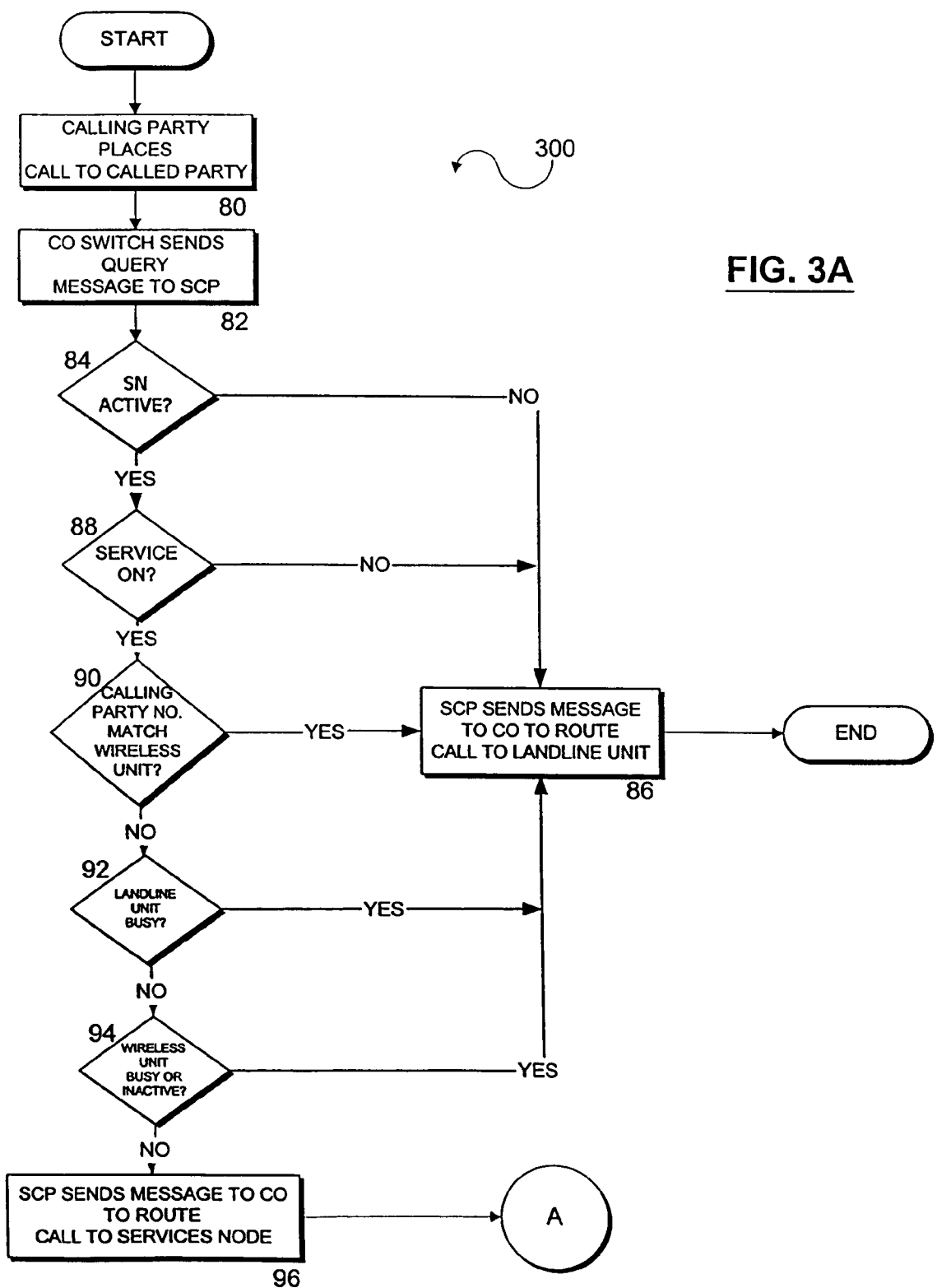
FIGS. 3A and 3B are flow diagrams showing an illustrative process for providing a simultaneous ring service according to one embodiment of the present invention.
Figure 3B:
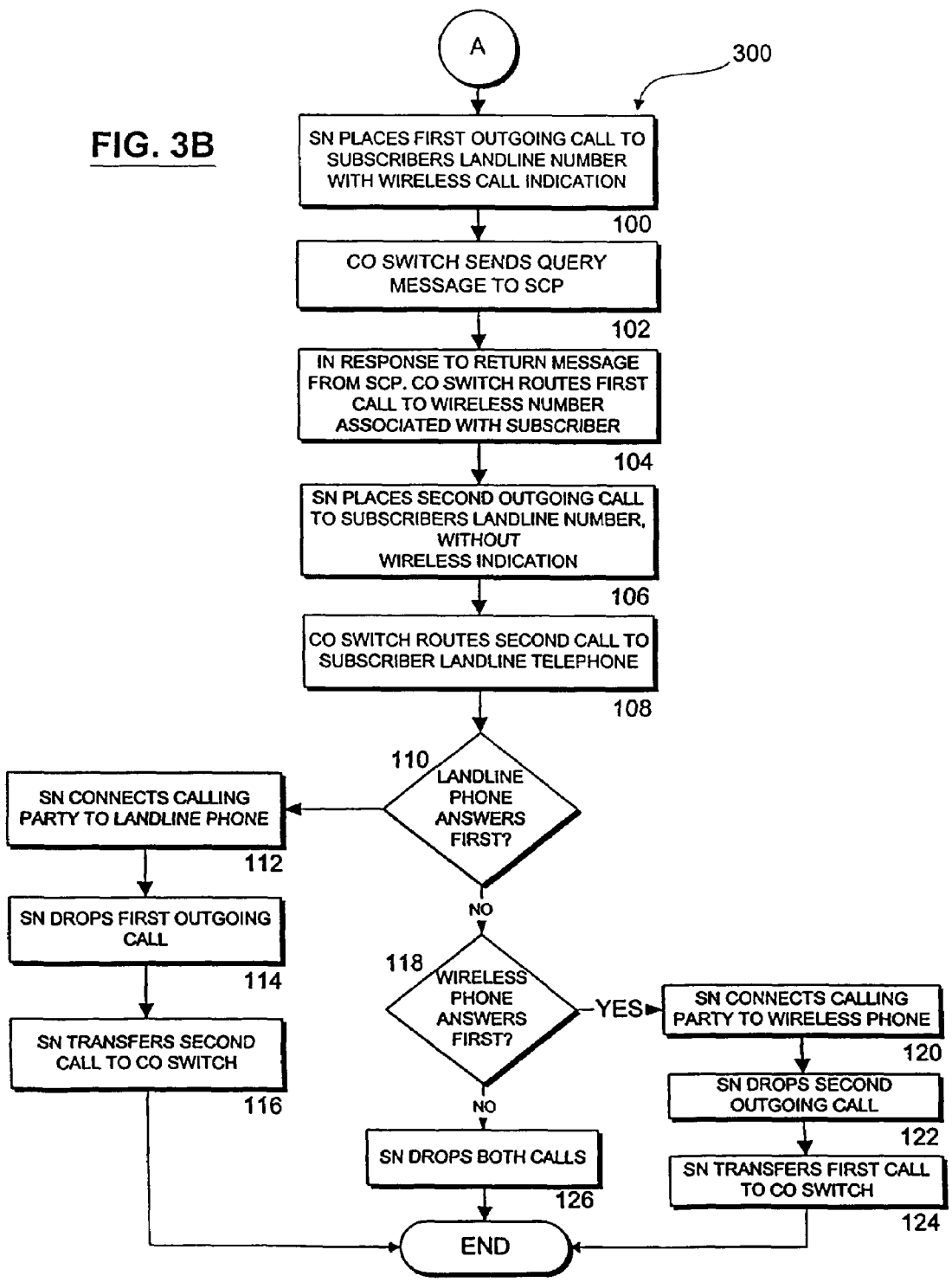
Figure 4A:
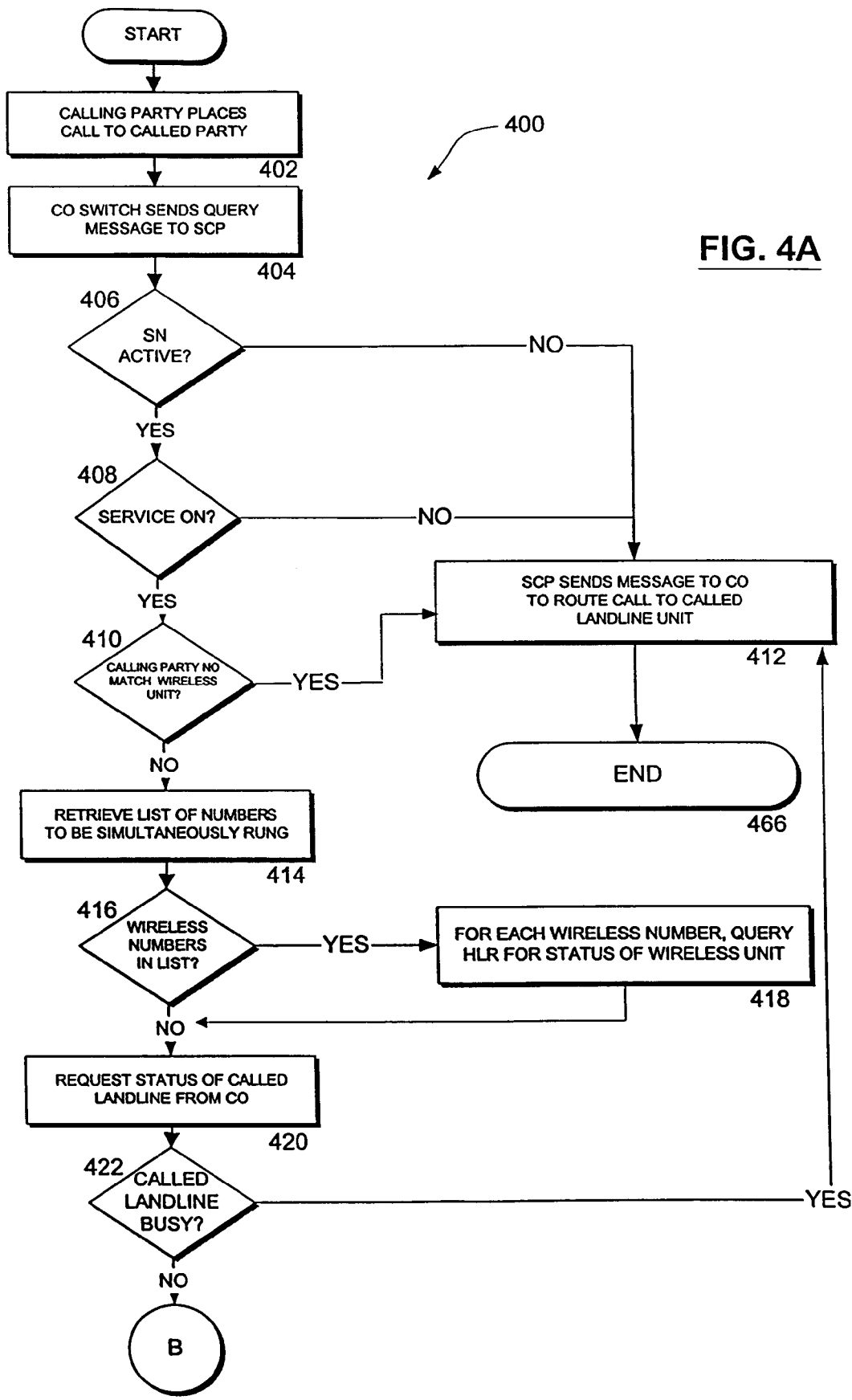
FIGS. 4A–4D are flow diagrams showing an illustrative process for providing a simultaneous ring service according to another embodiment of the present invention.
Figure 4B:
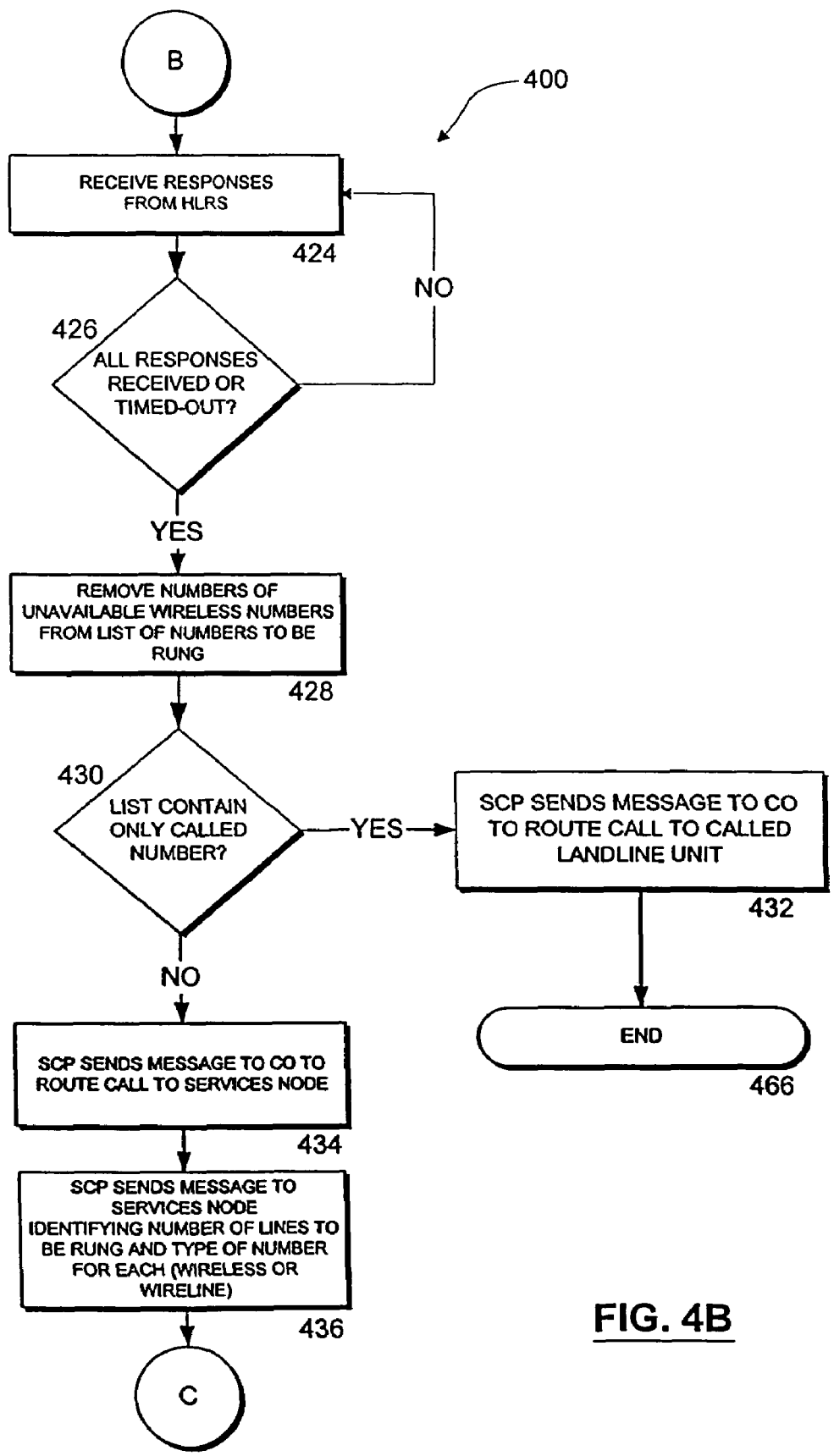
Figure 4C:
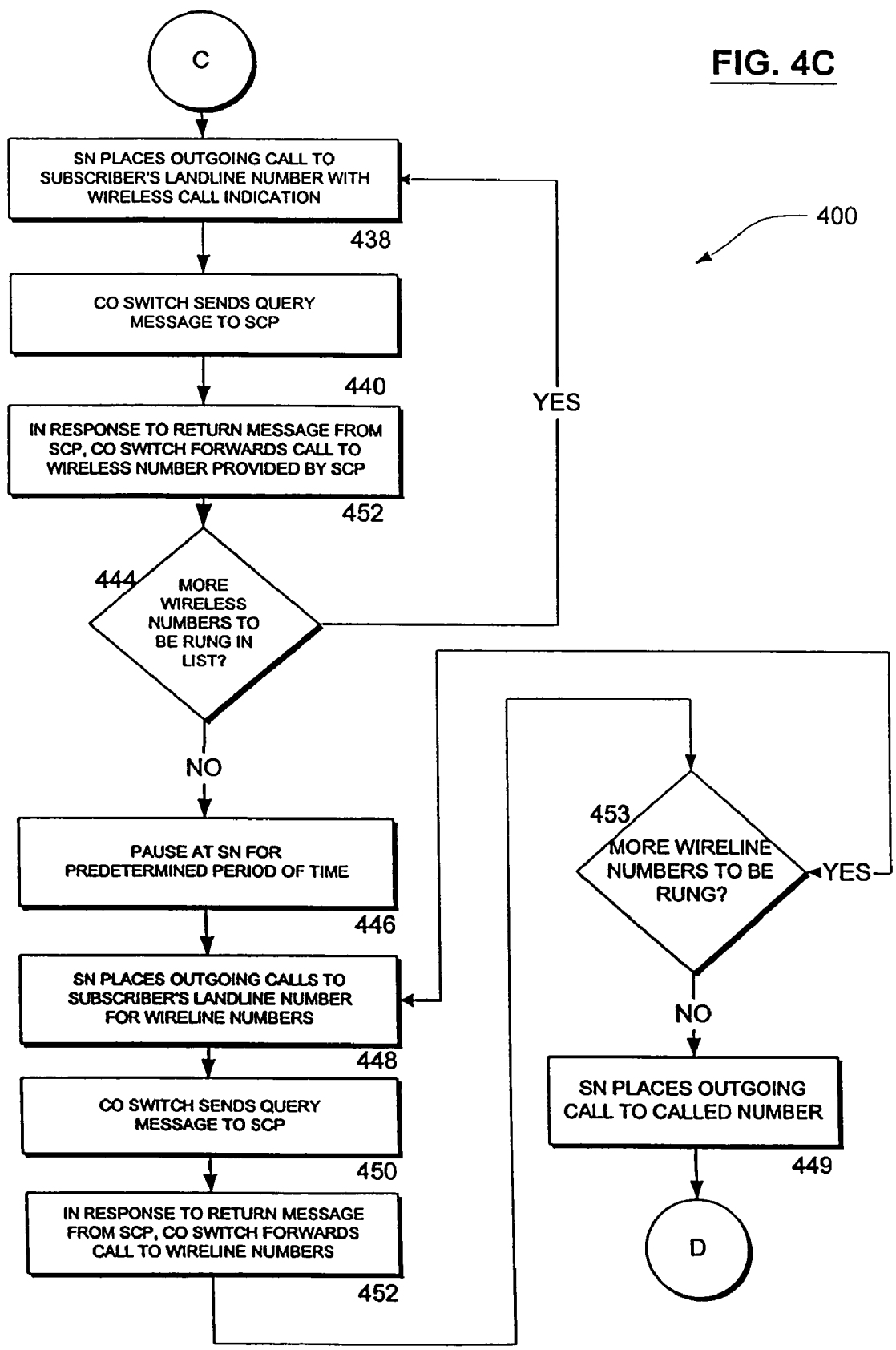
Figure 4D:
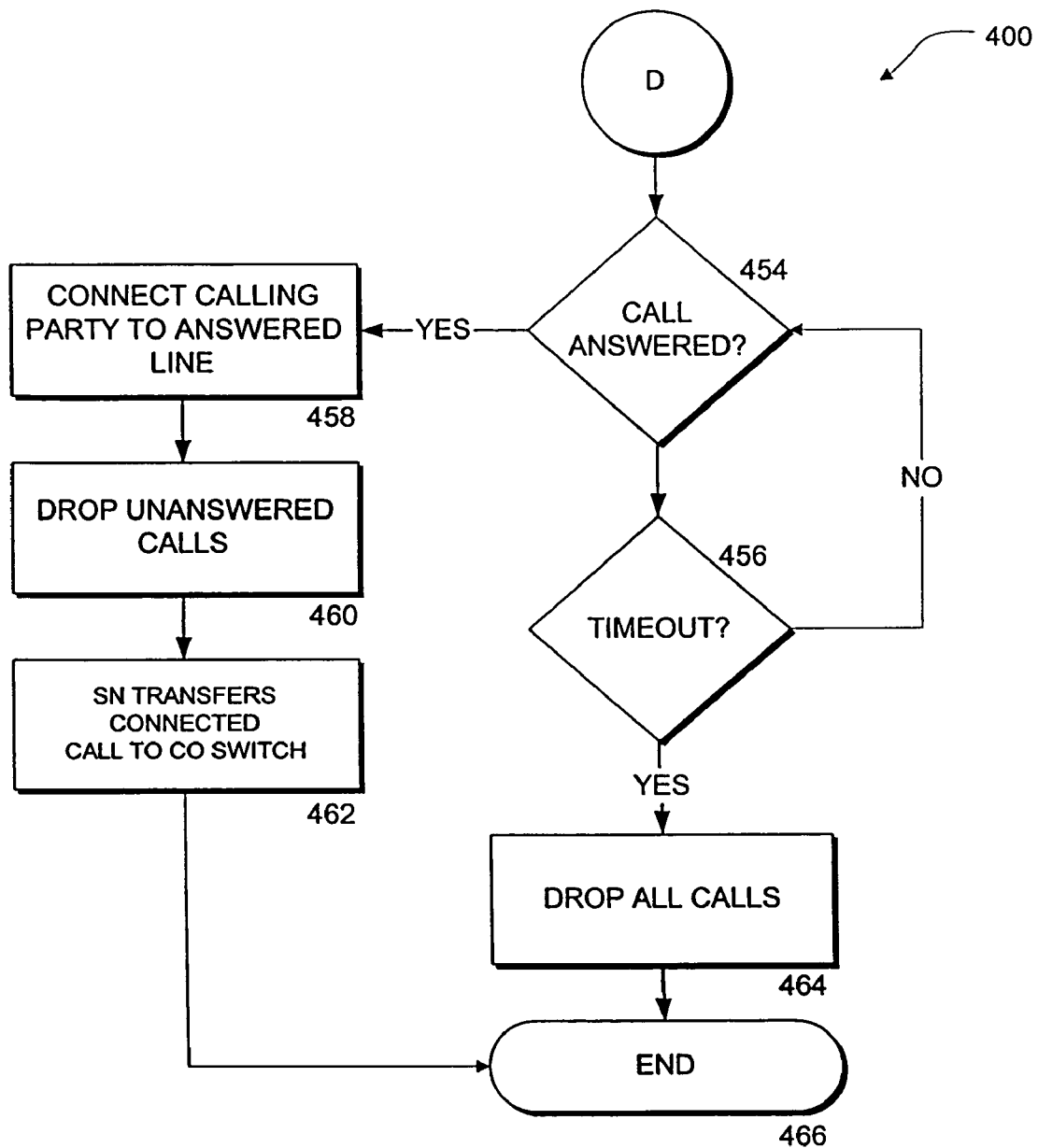

FIGS. 3A and 3B provide a process flow for implementing the simultaneous ring service according to one embodiment of the present invention wherein two telephones may be rung simultaneously. The process is described herein with reference to the system 40 illustrated in FIG. 2, with the calling party being a user of the landline telecommunications unit 22B and the landline telecommunications unit of the subscriber being the landline telephone 22A. In addition, the subscriber's associated wireless telecommunications unit is the wireless telephone 52A. Of course, the calling party need not initiate the call from a landline phone, but instead may initiate the call from a wireless telephone that is routed to the CO switch associated with the subscriber's landline telecommunications unit.

Referring now to FIG. 3A, the process 300 begins at block 80 with the calling party placing a call to the called party, the called party being a subscriber of the simultaneous ring service. From block 80 the process advances to block 82, where the CO switch 12A associated with the subscriber's landline telephone 22A, having been provisioned with a terminating attempt trigger ("TAT"), launches a TERMINATION_ATTEMPT query message to the SCP 28 in response to triggering of the TAT by the incoming call.

Upon receiving the query message, the SCP 28 initiates a series of verifications. The verifications may be performed by one or more SPAs of the SCP 28, as described hereinbefore. The first verification, at block 84, requires the SCP 28 to determine if the SN 34 is active. The SCP 28 may perform this function by, for example, periodically making customized dialing plan ("CDP") calls to the SN 34 to provide a heartbeat, thus allowing the SCP 28 to determine if the SN 34 is operational. If the SN 34 is not active (i.e., non-operational), the process 300 advances to block 86, where the SCP 28 may send an AUTHORIZE_TERMINATION message to the CO switch 12A to route the call to the landline telephone 22A, without additionally forwarding the call to the subscriber's wireless telephone unit.

Conversely, if at block 84 the SCP 28 determines that the SN 34 is operational, the process 300 may advance to block 88, where the SCP 28 may determine if the service subscriber currently has the simultaneous ring service activated. The SCP 28 may perform this function by interrogating the SCP database 32. If the service is not currently activated, the process advances to block 86 where the SCP 28 may send an AUTHORIZE_TERMINATION message to the CO switch 12A to route the call to the landline telephone 22A, without additionally forwarding the call to the subscriber's wireless telephone unit.

On the other hand, if the SCP 28 determines at block 88 that the simultaneous ring service is activated, the process 300 advances to block 90, where the SCP 28 determines whether the calling party number matches the subscriber wireless number (i.e., the directory number for the wireless unit 52), which is stored in the SCP database 32. If the numbers match, then the process 300 advances to block 84 where the SCP 28 may send an AUTHORIZE_TERMINATION message to the CO switch 12A to route the call to the landline telephone 22A, without additionally forwarding the call to the subscriber's wireless telephone unit, because this contingency typically corresponds to the subscriber calling home from the subscriber's wireless telephone, thus obviating the need to additionally ring the subscriber's wireless telephone.

Conversely, if the numbers do not match, the process 300 advances to block 92, where the SCP 28 determines if the subscriber's landline unit, i.e., the telephone 22A, is busy or otherwise inactive. The SCP 28 may perform this function by sending a MONITOR-FOR CHANGE message to the CO switch 12A requesting the status of the landline telephone 22A (e.g., busy, active). In response to the query, the CO switch 12A sends back to the SCP 28 a status reported message describing the existing status of the landline telephone 22A.

If the landline telephone 22A is busy or out of service, the process advances to block 86 where the SCP 28 may send an AUTHORIZE_TERMINATION message to the CO switch 12A to route the call to the landline telephone 22A, without additionally forwarding the call to the subscriber's wireless telephone unit. As a result, the calling party will experience a busy signal.

On the other hand, if the landline unit 22A is not busy or out of service, it may be considered to be "available," and the process 300 advances to block 94 where the SCP 28 determines if the wireless telecommunications unit (e.g., the wireless telephone 52A) associated with the subscriber is busy or otherwise inactive. The SCP 28 may perform this function by sending, for example, an IS-41 location request message to the HLR 50 of the subscriber's wireless service provider ("WSP") via the communications link 68 to request the status of the subscriber's wireless telecommunications unit 52A. The address for the HLR 50 of the subscriber's WSP may be stored, for example, in the SCP database 32. In response to the query message, the HLR 50 sends a location REQUEST_RETURN_RESULT message to the SCP 28 providing the status of the wireless telecommunications unit 52A. If, for example, the wireless unit 52A is out-of-range or powered off, its status may be considered inactive. In addition, if the wireless unit 52A is in use and is not provisioned with call waiting, then the wireless unit 52A may be considered to be busy. If the wireless unit 52A is not busy or otherwise inactive, it may be considered to be "available."

If the wireless unit 52A is busy or otherwise inactive, the process 300 advances to block 86 where the SCP 28 may send an AUTHORIZE_TERMINATION message to the CO switch 12A to route the call to the landline telephone 22A, without additionally forwarding the call to the subscriber's wireless telephone unit. This step prevents busy and inactive forwards from answering the incoming call before the subscriber can answer the landline phone 22A. Conversely, if the wireless unit 52A is not busy or otherwise inactive (i.e., available), the process 300 advances to block 96 where the SCP 28 sends a FORWARD_CALL message to the CO switch 12A to route the incoming call from the calling party to the SN 34.

According to another embodiment, at block 94 the SCP 28 may allow only a predetermined time period for the HLR 50 to respond in response to the IS-41 location request message such as, for example, two seconds. If the HLR 50 does not send the location REQUEST_RETURN_RESULT message within the predetermined time period, the SCP 28 may assume, for example, that the wireless unit 52A is active, for which case the process flow advances to block 96.

Referring now to FIG. 3B, the process 300 advances from block 96 to block 100, where the SN 34 places a first outgoing call. The intended destination of the first call from the SN 34 is the subscriber's wireless unit 52A. However, because the SN 34 does not have data regarding the subscriber's wireless directory number, the SN 34 sends the first call to the CO switch 12A with a wireless indicator. For example, according to an embodiment where the communications link 36 is a PRI trunk, the SN 34 may establish the call via a CHANNEL_SETUP PRI trigger assigned to the SN PRI trunk 36, and a "wireless call" indication digit may be included in the redirecting number field.

From block 100 the process advances to block 102, where the CO switch 12A servicing the subscriber's landline telephone 22A detects a TAT and, in response to the wireless call indication digit, sends a TAT query message to the SCP 28. In response to the query message from the CO switch 12A, at block 104 the SCP 28 interrogates the database 32 for the subscriber's wireless number, and forwards instructions to the CO switch 12A to route the first call from the SN 34 thereto. The SCP 28 also instructs the switch 12A to substitute the telephone number of the calling party for the telephone number of the SN 32 in the appropriate caller ID field.

From block 104 the process 300 advances to block 106, where the SN 32 places a second outgoing call to the subscriber's landline telephone 22A. Because the intended destination of the second call is the landline telephone 22A, the call does not include a wireless indicator. In response to receiving the second call, the CO switch 12A routes the second call to the landline telephone 22A according to conventional call processing. It should be noted that this call will also encounter a TAT, but the calling number, i.e., the SN 32, can be used to identify this as a call that should be completed to the telephone 22A.

According to one embodiment, because of inherent delays in existing wireless networks, the second call may be placed a predetermined time period after the first call from the SN 34 is placed such as, for example, four seconds. This predetermined time period may be implemented, for example, using a timer implemented by the SN 34.

From block 108, the process 300 advances to block 110, where the SN 34 determines which call is answered first. If at block 110 it is determined that the landline telephone 22A is answered first (i.e., the second call from the SN 34), the process 300 advances to block 112 where the SN 34 connects the calling party to the landline phone 22A. For example, if the trunk of communications link 36 handling the second call from the SN 34 delivers a call complete indication first, the incoming call is connected to that trunk. Next the process proceeds to block 114 where the SN 34 subsequently drops the first call (i.e., the call to the wireless unit 52A). As a result, a user of the wireless unit 52A is free to originate unrelated outgoing calls if desired. Thereafter, at block 116, the SN 34 transfers the second call to a CO switch such that the SN 34 is no longer used to process the completed call.

If at block 110, the SN 34, determines that the landline phone 22A is not answered first, the process 300 advances to block 118 where the SN 34 determines whether the wireless telephone 52A is answered first. If so, the process 300 advances to block 120 where the SN 34 connects the calling party to the wireless telephone 52 (the first call from the SN 34). For example, if the trunk of communications link 36 handling the first call from the SN 34 delivers a call complete indication first, the incoming call is connected to that trunk. The process 300 then advances to block 122 where the SN 34 subsequently drops the second outgoing call. (i.e., the call to the landline telephone 22A). As a result, a user of the landline unit 22A is free to originate unrelated outgoing calls if desired. Thereafter, the process advances to block 124 where the SN 34 transfers the first call to the CO switch 12A such that the SN 34 is no longer used to process the completed call. If neither call from the SN 34 is answered, the process advances from block 118 to block 126 where the SN 34 may drop both calls and end all call processing.

According to one embodiment of the present invention, existing terminating call treatments, such as voice mail, may continue to apply. That is, as described previously, the calling party is connected to whichever telecommunications unit (the wireless unit 52A or the landline unit 22A) answers first, regardless of whether the answering party is a person or voice mail. To avoid undesirable side effects, however, the interaction of the voice mail systems with the simultaneous ring service of the present invention may require some modification of the voice mail systems such as, for example, increasing the number of rings before forwarding the incoming call to voice mail, or removing the voice mail service from one or more of the targeted phones.

Referring now to FIGS. 4A–4D, an illustrative process 400 will be described for providing an embodiment of the invention in which any number of telephone lines may be simultaneously rung. The process 400 is described herein with reference to the system 40 illustrated in FIG. 2, with the calling party being a user of the landline telecommunications unit 22B and the landline telecommunications unit of the subscriber being the landline telephone 22A. As described briefly above, the subscriber may utilize a voice activated administration system or an Internet Web site to provide a list of numbers that should be simultaneously rung along with the landline telephone 22A. The list of numbers identified by the subscriber are stored in the database 32. For instance, the subscriber may specify that the wireless telephone 52B and the landline telephone 22D be rung simultaneously when an incoming communication is received directed toward the subscriber's landline telephone 22A. The telephone numbers associated with the wireless telephone 52B and the landline telephone 22D are stored in the database 32. Numbers of other telephones to be simultaneously rung may also be stored in the database 32. As will be described in greater detail below, when an incoming communication is received from the landline telephone 22B directed toward the subscriber's landline telephone 22A, the wireless telephones 52A and 52B, and the wireline telephone 22D will be rung simultaneously. Any number of other telephones identified by the subscriber may also be rung in a similar manner.

The process 400 begins at block 402 with the calling party placing a call to the called party, the called party being a subscriber of the simultaneous ring service. From block 402, the process 400 continues to block 404, where the CO switch 12A associated with the subscriber's landline telephone 22A, having been provisioned with a TAT specific to the simultaneous ring service for the subscriber, launches a TERMINATION_ATTEMPT query message to the SCP 28 in response to triggering of the TAT by the incoming call. Upon receiving the query message, the SCP 28 initiates a series of verifications. The verifications may be performed by one or more SPAs of the SCP 28, as described previously herein. The first verification, performed at block 406, requires the SCP 28 to determine if the SN 34 is active. The SCP 28 may perform this function by, for example, periodically making CDP calls to the SN 34 to provide a heartbeat. If the SN 34 is not active, the process 400 advances to block 412, where the SCP 28 may send an AUTHORIZED_TERMINATION message to the CO switch 12A to route the call to the landline telephone 22A without simultaneously ringing any other numbers.

If, however, at block 406, the SCP 28 determines that the SN 34 is operational, the process 400 advances to block 408, where the SCP 28 determines whether the subscriber currently has the simultaneous ring service activated. The SCP 28 may perform this function by interrogating the SCP database 32. If the service is not currently activated, the process 400 branches to block 412, where the SCP 28 instructs the CO switch 12A to route the call to the landline telephone 22A without simultaneously ringing any other telephones.

If, at block 408, the SCP 28 determines that the simultaneous ring service is activated, the process 400 continues to block 410. At block 410, the SCP 28 determines whether the calling party number matches the subscriber's wireless telephone number which is stored in the SCP database 32. If the two numbers match, the process 400 branches to block 412, where the SCP 28 instructs the CO switch 12A to route the call to the landline telephone 22A without ringing any other telephones. However, if at block 410, the SCP 28 determines that the two numbers do not match, the process 400 continues to block 414.

At block 414, the SCP 28 retrieves the list of telephone numbers to be simultaneously rung from the database 32. The process 40 then continues to block 416, where the SCP 28 determines whether any telephone numbers corresponding to wireless telephones are identified in the list of phone numbers to be simultaneously rung. If any wireless telephone numbers are contained on the list, the process 400 branches to block 418. At block 418, the SCP 28 queries the HLR 50 for the status of the wireless telephone unit associated with each of the wireless telephone numbers identified in the list of numbers to be simultaneously rung. As described above, the SCP 28 may accomplish this by transmitting an IS-41 location request message to the HLR 50. It should be appreciated that the SCP 28 may transmit such messages to a variety of HLRs associated with the particular wireless telephone units. According to one embodiment of the invention, the SCP 28 transmits location request messages to the HLR 50 prior to determining the status of any landline telephone to account for inherent delays in the wireless telephone system. From block 418, the process 400 continues to block 420.

At block 420, the SCP 28 determines the status of the subscriber's landline unit, (i.e., the telephone 22A), to determine if the unit is busy or otherwise inactive. The process 400 then continues to block 422 where the SCP 28 determines if the called landline is busy. If the called landline is busy, the process 400 branches to block 412, where the call is routed to landline telephone 22A without additionally ringing any other telephones. As a result, the calling party will experience a busy signal or whatever busy treatment (e.g. voice mail) is configured on the line.

From block 422, the process 400 continues to block 424 where responses are received at the SCP 28 from the queried HLRs 50. These responses indicate the status of the wireless telephone units for which a query message was previously sent to the HLRs 50 at block 418. In some situations, an HLR 50 may not respond to the request within a predetermined period of time. If the HLR 50 fails to respond in this predetermined period of time, the HLR 50 will be deemed to have timed-out.

From block 424, the process 400 continues to block 426, where a determination is made by the SCP 28 as to whether replies have been received in response to each of the query messages or whether these requests timed-out. If responses have not been received or timed-out, the process 400 returns to block 424 where additional responses are received. If all the queries have been responded to or timed-out, the process 400 continues from block 426 to block 428.

At block 428, the SCP 28 removes the numbers of wireless telephones for which a response was received indicating that the telephone was unavailable from the list of numbers to be rung. In this manner, calls will not be set up directed to wireless telephones to which a communication could not be completed.

From block 428, the process 400 continues to block 430, where the SCP 28 determines whether the list of numbers to be run contains only the called number. If the list contains only the called number, the process 400 branches to block 432, where the SCP 28 sends a message to the CO 12A to route the call to the landline unit 22A. In this manner, a call will be completed directly to the landline telephone 22A where the number of the landline telephone 22A is the only number remaining in the list of numbers to be rung after status responses have been received from the HLRs 50. From block 432, the process 400 continues to block 466, where it ends.

If, at block 430, the SCP 28 determines that the list of numbers to be rung contains additional numbers other than the called telephone number, the process 400 continues to block 434. At block 434, the SCP 28 sends a FORWARD_CALL message to the CO switch 12A to route the incoming call from the calling party to the SN 34. The process 400 then continues from block 434 to block 436.

At block 436, the SCP 28 transmits a message to the SN 34 identifying the number of lines to be rung and the type of number for each. For instance, the SCP 28 may transmit a message to the SN 34 indicating that four lines should be rung simultaneously and identifying whether each of the four lines is a wireless or a wireline telephone. As will be described in greater detail below, this message is utilized by the SN 34 to set up calls directed toward each of the telephone lines to be simultaneously rung. According to one embodiment, this message is sent in real-time using TCP/IP. Alternatively, this message may be embedded in the call setup message that the SN 34 receives with the forwarded call.

From block 436, the process 400 continues to block 438. At block 438, the SN 34 places a first outgoing call. The SN 34 sends the first call to the SO switch 12A with a wireless call indication. For example, according to an embodiment where the communications link 36 is a PRI trunk, the SN 34 may establish the call via a CHANNEL_SETUP_PRI trigger assigned to the SN PRI trunk 36, and a wireless call indication digit may be included in the REDIRECTING_NUMBER field.

From block 438, the process 400 continues to block 440, where the CO switch 12A servicing the subscriber's landline telephone 22A detects a termination attempt trigger and, in response to the wireless call indication digit, sends a TAT query message to the SCP 28. From block 440, the process 400 continues to block 442. At block 442, in response to the query message from the CO switch 12A, the SCP 28 interrogates the database 32 for one of the wireless telephone numbers to be simultaneously rung. Additionally, the SCP 28 forwards instructions to the CO switch 12A to route the call from the SN 34 to the wireless number. The SCP 28 also instructs the switch 12A to substitute the telephone number of the calling party for the telephone number of the SN 32 in the appropriate caller ID field. The process 400 then continues to block 444, where the SN 34 determines whether additional wireless telephone numbers remain to be simultaneously rung. The SN 34 makes this determination based on the message transmitted from the SCP 28 to the SN 34 at block 436 above.

If, at block 444, the SN 34 determines that additional wireless telephone numbers remain in the list of numbers to be simultaneously rung, the process 400 branches to block 438. In this manner, each wireless telephone number identified in the list of telephone numbers to be rung is rung as described above with reference to blocks 438, 440, and 442. If, however, at block 444, the SN 34 determines that no additional wireless telephone numbers remain to be simultaneously rung, the process 400 continues to block 446.

At block 446, the SN 34 pauses for a predetermined period of time to take into account inherent delays in existing wireless telephone networks. In this manner, subsequent telephone calls to wireline telephones may be placed a predetermined time period after the calls placed to wireless telephone lines. For example, in one embodiment of the invention, the predetermined period of time is four seconds. This predetermined time period may be implemented using a timer included with the SN 34. Once the predetermined period of time has elapsed, the process 400 continues to block 448.

At block 448, the SN 34 places an outgoing call to the subscriber's landline telephone 22A for a wireline number other than the subscriber's landline number. This call from the SN 34 to the CO switch 12A also includes a wireless call indication digit in the REDIRECTING_NUMBER field. This causes the CO switch 12A to query the SCP 28 at block 450 for the number to which the incoming call should be redirected. In response, the SCP 28 returns the telephone number associated with one of the landline telephones to be rung to the CO switch 12A. In response to the return message from the SCP 28, the CO switch 12A forwards the call from the SN 34 to the wireline number identified by the SCP 28 at block 452.

From block 452, the process 400 continues to block 453, where the SN 34 determines whether additional wireline numbers to be rung remain in the list of telephone numbers to be simultaneously rung. This determination is made by the SN 34 based on the message transmitted to the SN 34 by the SCP 28 at block 436. If additional numbers remain to be rung, the process 400 branches from block 453 to block 448 where additional wireline numbers are rung in the manner as described above. If, at block 453, the SN 34 determines that no additional wireline numbers remain to be rung, the process 400 continues to block 449.

At block 449, the SN 34 places an outgoing call to the subscriber's landline telephone 22A. The intended destination of this call is the landline 22A and, therefore, the call does not include a wireless indicator. In response to receiving this call from the SN 34, the CO switch 12A routes this call to the landline 22A according to conventional call processing. It should be noted that this call will also encounter a TAT, but the calling number can be used to identify this call as a call that should be completed to the telephone 22A. From block 449, the process 400 continues to block 454.

At block 454, the SN 34 determines whether one of the outgoing calls placed to the wireless telephone lines, the wired telephone lines, or the subscriber's landline telephone 22A has been answered. If, at block 454, the SN 34 determines that no call has been answered, the process 400 continues to block 456, where the SN 34 determines whether a predetermined time has passed since the outgoing calls were placed without the calls being answered. If such a predetermined period of time has expired, the calls are considered to have timed-out. If the predetermined period of time has not elapsed, the process 400 returns to block 454 where the SN 34 again determines whether the call has been answered. If the calls have timed-out at block 456, the process 400 continues to block 464, where each of the outgoing calls is dropped by the SN 34. The process 400 then continues to block 466 where it ends.

If, however, at block 454, the SN 34 determines that one of the outgoing telephone calls has been answered the process 400 branches to block 458. At block 458, the SN 34 connects the calling party to the answered line. For example, if the trunk of communications link 36 handling a call from the SN 34 delivers a call complete indication first, the incoming call is connected to that trunk.

From block 458, the process 400 then continues to block 460 where the SN 34 drops each of the unanswered telephone calls. Thereafter, at block 462, the SN 34 transfers the answered line to the CO switch 12C such that the SN 34 is no longer used to process the completed call. The process 400 then continues from block 462 to block 466, where it ends.

Although the present invention has been described herein with respect to certain embodiments, those of ordinary skill in the art will recognize that many modifications and variations of the present invention may be implemented. For example, certain of the verifications performed by the SCP 28 described in conjunction with FIG. 3 may be performed according to alternative sequences or by alternative devices. The foregoing description and the following claims are intended to cover all such modifications and variations.

What is claimed is:

1. A system for providing a simultaneous ring service for a subscriber, comprising:
   a switch in communication with a landline telecommunications unit associated with the subscriber for detecting a first terminating trigger specific to the service in response to an incoming communication to the landline telecommunications unit from a calling party;
   a service control point in communication with the switch for determining, in response to detection of the first terminating trigger by the switch, whether two or more telecommunications units to be simultaneously rung are available; and
   a services node in communication with the switch for receiving the incoming communication from the switch when the service control point determines that two or more telecommunications units to be simultaneously rung are available, and, in response thereto, for placing at least one outgoing communication for each of the available telecommunications units to be simultaneously rung,
   wherein the switch is further for receiving the outgoing communications and for detecting a terminating trigger in response to receiving each of the outgoing communications, and
   wherein the service control point, in response to detection of the terminating triggers generated by the outgoing communications received by the switch, is further for instructing the switch to route each of the outgoing communications to one of the two or more communications units to be simultaneously rung.

2. The system of claim 1, wherein the services node is further for:
   connecting the incoming communication to the outgoing communication associated with the one of the two or more telecommunications units simultaneously rung that is answered first.

3. The system of claim 2, wherein the services node is further for:

dropping each of the outgoing communications other than the outgoing communication associated with the one of the two more telecommunications units simultaneously rung that is answered first.

4. The system of claim 3, wherein the service control point includes an associated database storing directory numbers associated with each of the two or more telecommunications units to be simultaneously rung, and wherein the services node is not for storing the directory numbers.

5. The system of claim 4, wherein the services node is further for placing the outgoing communications associated with wireless directory numbers a predetermined time period before placing the outgoing communications associated with wireline directory numbers.

6. The system of claim 1, wherein the two or more telecommunications units to be rung simultaneously may comprise wireless units or landline units and wherein the service control point is for determining whether landline telecommunications units are available by sending a query message to the switch requesting a status of the landline telecommunications units.

7. The system of claim 6, wherein the service control point is for determining whether the wireless units are available by sending a query message to one or more home location registers requesting the status of the wireless telecommunications units.

8. The system of claim 7, wherein the service control point is further for determining that one of the wireless units is available when the home location register does not respond to the query message within a predetermined time period.

9. The system of claim 1, wherein the service control point is further for instructing the switch to route the incoming communication to the landline telecommunications unit when the service control point determines that the landline telecommunications unit is not available.

10. A method for providing a simultaneous ring service for a subscriber, comprising:
    detecting an incoming communication from a calling party to a landline telecommunications unit associated with the subscriber;
    determining, in response to detection of the incoming communication, whether each of a plurality of telecommunications units to be simultaneously rung are available;
    receiving an indication of the number of telecommunications units to be simultaneously rung that are available and whether each telecommunication unit to be simultaneously rung is a landline unit or a wireless unit; and
    placing outgoing communications to each of the plurality of telecommunications units to be simultaneously rung that are available, with a terminating trigger associated with each, and the landline telecommunications unit when the landline telecommunications unit and at least one of the telecommunications units to be simultaneously rung are available.

11. The method of claim 10, further comprising:
    connecting the incoming communication to the first telecommunications unit to be answered of either the landline telecommunications unit or the plurality of telecommunications units that are available.

12. The method of claim 11, further comprising:
    dropping each of the outgoing communications other than the outgoing communication associated with the first telecommunications unit to be answered.

13. The method of claim 10, wherein placing the outgoing communications includes placing the outgoing communications to telecommunications units that are wireless a predetermined time period before placing the outgoing communications to telecommunications units that are wired units.

14. The method of claim 10, wherein determining whether the landline telecommunications units are available includes sending a query message requesting a status of the landline telecommunications units.

15. The method of claim 14, wherein determining whether the wireless telecommunications units are available includes sending a query message to one or more home location registers requesting a status of the wireless telecommunications units.

16. The method of claim 15, wherein determining whether one of the wireless telecommunications units is available includes determining that the wireless telecommunications unit is available when the home location register does not respond to the query message within a predetermined time period.

17. The method of claim 10, further comprising routing the incoming communication to the landline telecommunications unit when it is determined that the landline telecommunications unit is not available.

18. A system for providing a simultaneous ring service for a subscriber, comprising:
    means for detecting an incoming communication from a calling party to a landline telecommunications unit associated with the subscriber;
    programmable determination means for determining, in response to detection of the incoming communication, whether the landline telecommunications unit and each of a plurality of telecommunications units to be simultaneously rung are available;
    programmable service means for receiving an indication of the number of telecommunications units to be simultaneously rung that are available and whether each telecommunication unit to be simultaneously rung is a landline unit or a wireless unit and for placing outgoing communications to the landline telecommunications unit and each of the telecommunications units to be simultaneously rung that are available, with a terminating trigger associated with each; and
    programmable switching means for connecting the incoming communication to the first unit answered of the landline telecommunications unit and the telecommunications units simultaneously rung.

19. The system of claim 18, wherein the programmable service means further includes:
    programmable means for dropping the first each of the outgoing communications other than the first unit answered.

20. The system of claim 19, wherein the programmable service means for placing the outgoing communications includes programmable service means for placing outgoing communications to wireless telecommunications units a predetermined time period before placing second outgoing communications to wired telecommunications.

21. The system of claim 20, wherein the programmable means for determining whether the landline telecommunications unit is available includes programmable means for sending a query message requesting a status of the landline telecommunications unit.

22. The system of claim 21, wherein the programmable means for determining whether each of the telecommunications units to be simultaneously rung are available includes programmable means sending a query message to a home location register requesting a status of any wireless telecommunications unit.

* * * * *